United States Patent
Hagiwara

(10) Patent No.: US 9,541,571 B2
(45) Date of Patent: Jan. 10, 2017

(54) STATE DETECTING DEVICE, ELECTRONIC APPARATUS, PROGRAM AND STATE DETECTING METHOD

(75) Inventor: Norihisa Hagiwara, Hachioji (JP)

(73) Assignee: SEIKO EPSON CORPORATION, Tokyo (JP)

(*) Notice: Subject to any disclaimer, the term of this patent is extended or adjusted under 35 U.S.C. 154(b) by 858 days.

(21) Appl. No.: 13/541,122

(22) Filed: Jul. 3, 2012

(65) Prior Publication Data

US 2013/0013249 A1 Jan. 10, 2013

(30) Foreign Application Priority Data

Jul. 6, 2011 (JP) .................. 2011-150226

(51) Int. Cl.
G01P 13/00 (2006.01)

(52) U.S. Cl.
CPC ..................... G01P 13/00 (2013.01)

(58) Field of Classification Search
CPC .............. A63B 2024/0071; A63B 2220/40; A63B 2220/803; G01C 22/006; G01C 21/16; G01C 21/165
See application file for complete search history.

(56) References Cited

U.S. PATENT DOCUMENTS

| | | |
|---|---|---|
| 2007/0150229 A1 | 6/2007 | Fujiwara |
| 2008/0190201 A1 | 8/2008 | Makino |
| 2010/0069203 A1 | 3/2010 | Kawaguchi et al. |
| 2010/0161271 A1* | 6/2010 | Shah et al. ........... 702/141 |
| 2011/0282620 A1* | 11/2011 | Sakuraoka ............ 702/141 |

FOREIGN PATENT DOCUMENTS

| | | |
|---|---|---|
| JP | A-11-2542 | 1/1999 |
| JP | 2002-048589 A | 2/2002 |
| JP | A-2005-286809 | 10/2005 |
| JP | A-2007-178303 | 7/2007 |
| JP | 2007-226371 A | 9/2007 |
| JP | A-2007-278983 | 10/2007 |
| JP | A-2010-5033 | 1/2010 |
| JP | A-2010-68968 | 4/2010 |
| WO | WO 2005/096597 A1 | 10/2005 |

OTHER PUBLICATIONS

International Telecommunication Union, Nomenclature of the Frequency and Wavelength Bands Used in Telecommunications, Rec. ITU-R V.431-7, 2000.*

* cited by examiner

Primary Examiner — Gregory J Toatley
Assistant Examiner — Kyle R Quigley
(74) Attorney, Agent, or Firm — Oliff PLC

(57) ABSTRACT

A state detecting device includes an acquisition unit which acquires an x-axis component, a y-axis component and a z-axis component of an acceleration signal from an acceleration sensor, and an arithmetic unit which performs arithmetic processing. The arithmetic unit calculates a coordinate transformation matrix for finding an acceleration component in horizontal direction, from an average value of the x-axis component, an average value of the y-axis component and an average value of the z-axis component acquired by the acquisition unit, and discriminates between a first state where a person is in a first type of vehicle and a second state where the person is in a second type of vehicle that is different from the first type, based on the coordinate transformation matrix that is calculated and a first indicator value obtained from the x-axis component, the y-axis component and the z-axis component.

18 Claims, 9 Drawing Sheets

STATE DETECTING DEVICE, ELECTRONIC APPARATUS, PROGRAM AND STATE DETECTING METHOD

The present application claims a priority based on Japanese Patent Application No. 2011-150226 filed on Jul. 6, 2011, the contents of which are incorporated herein by reference.

BACKGROUND

1. Technical Field

The present invention relates to a state detecting device, an electronic apparatus, a program and a state detecting method or the like.

2. Related Art

According to a related art, mainly in the field of automobile, a technique of determining whether an automobile is in motion or at a standstill is known. Also, a technique of discriminating whether a person is walking or in a vehicle is disclosed to the public. For example, JP-A-2005-286809 discloses a technique of detecting a state of use of a portable information processing device by a user, based on sensor information from a motion sensor. In JP-A-2005-286809, a state of activity of the user (standing still, walking, running, moving by vehicle) or the like is detected based on acceleration data from an acceleration sensor.

Moreover, a technique of discriminating a state of motion of the user such as running, walking, bicycle, standstill, automobile, bus, train or the like is discriminated using a microphone and the GPS as well as an acceleration sensor is disclosed to the public.

According to JP-A-2005-286809, while walking or standing still can be discriminated from moving by vehicle, car and train cannot be discriminated in the case of moving by vehicle. Also, though car, bus and train or the like can be discriminated by using a microphone and the GPS, there is a problem that the GPS cannot perform positioning in a subway or the like and that the microphone is strongly influenced by ambient noise. Consequently, determination errors may occur. There is also a problem of large power consumption required for the use of the GPS and microphone.

SUMMARY

An advantage of some aspects of the invention is to provide a state detecting device, an electronic device, a program and a state detecting method or the like which enable determination of whether a person is in a first vehicle or in a second vehicle that is different from the first vehicle, based on an acceleration signal from an acceleration sensor.

An aspect of the invention is directed to a state detecting device including an acquisition unit which acquires an x-axis component, a y-axis component and a z-axis component of an acceleration signal from an acceleration sensor, and an arithmetic unit which performs arithmetic processing. The arithmetic unit calculates a coordinate transformation matrix for finding an acceleration component in horizontal direction, from an average value of the x-axis component, an average value of the y-axis component and an average value of the z-axis component acquired by the acquisition unit, and discriminates between a first state where a person is in a first type of vehicle and a second state where the person is in a second type of vehicle that is different from the first type, based on the coordinate transformation matrix that is calculated and a first indicator value obtained from the x-axis component, the y-axis component and the z-axis component.

According to this aspect, the coordinate transformation matrix is found and the first indicator value is acquired based on the coordinate transformation matrix that is found and the x-axis component, the y-axis component and the z-axis component. The first state and the second state are discriminated from each other based on the acquired first indicator value. Therefore, it is possible to discriminate the moving by different vehicles based on the sensor signal from the acceleration sensor, or the like.

In one embodiment of the invention, the arithmetic unit may find a first feature quantity based on a signal intensity of the acceleration signal and may perform band pass filter processing to the signal intensity to find a second feature quantity. The arithmetic unit may find a second indicator value from the first feature quantity and the second feature quantity and may discriminate between the first state and the second state based on the first indicator value and the second indicator value.

Thus, state detection based on frequency characteristics can be carried out without frequency conversion such as FFT. Therefore, it is possible to reduce processing load and restrain power consumption or the like, compared with the case where frequency conversion is carried out.

In one embodiment, the arithmetic unit may find the second indicator value from a ratio of the first feature quantity to the second feature quantity.

Thus, instead of an absolute value of the second feature quantity having a characteristic corresponding to the frequency, a relative value to the first feature quantity can be used as the second indicator value. Therefore, it is possible to carry out processing without being influenced by the overall intensity of the acceleration signal value, or the like.

In one embodiment, the arithmetic unit may find N signal intensities of the acceleration signal from N (N being an integer equal to or greater than 1) units of the x-axis component, N units of the y-axis component and N units of the z-axis component, may find the first feature quantity from a sum of absolute differences between each signal intensity of the N signal intensities and an average value of the signal intensities, and find the second feature quantity from a sum of absolute values of values obtained by performing the band pass filter processing to the N signal intensities.

Thus, the first feature quantity and the second feature quantity can be found specifically. Since these feature quantities are found from the sum of absolute values or the sum of absolute differences, the processing load is lighter than in frequency conversion or the like.

In one embodiment, the arithmetic unit may perform processing to implement the band pass filter with a pass band including 1 to 3 Hz, as the band pass filter processing.

Thus, it is possible to perform the band pass filter processing in which a band corresponding to a frequency band that appears characteristically in the acceleration signal in moving by the second type of vehicle (in this case, train).

In one embodiment, the arithmetic unit may find a third indicator value based on count error information indicating a degree of count error from a number of steps detecting unit and may discriminate between the first state and the second state based on the first indicator value, the second indicator value and the third indicator value.

Thus, the third indicator value can be found based on the count error information in the number of steps detecting unit.

In one embodiment, the arithmetic unit may find the third indicator value by using, as the count error information, number of steps detection information in the number of steps detecting unit in the case where a current state is determined as not a walking state.

Thus, the number of steps detection information in the case where the current state is determined as not a walking state can be used as the count error information.

In one embodiment, the arithmetic unit may find the first indicator value based on the coordinate transformation matrix, the average value of the x-axis component, the average value of the y-axis component and the average value of the z-axis component.

Thus, the first indicator value can be found from the coordinate transformation matrix and the average value on each axis. Since filter processing or the like is not carried out, processing based on the difference in acceleration signal (degree of change) between the first state and the second state, or the like, can be carried out.

In one embodiment, in the case where an interval in which N (N being an integer equal to or greater than 1) units of the x-axis component, N units of the y-axis component and N units of the z-axis component are acquired is a unit interval, the arithmetic unit may find an i-th horizontal component from the coordinate transformation matrix and the x-axis component, the y-axis component and the z-axis component in an i-th (i being an integer equal to or greater than 1) unit interval, and may find an (i+1)th horizontal component from the coordinate transformation matrix and the x-axis component, the y-axis component and the z-axis component in an (1+1)th unit interval that is next to the i-th unit interval. The arithmetic unit may find a difference value between the i-th horizontal component and the (i+1)th horizontal component that are obtained, and may find the first indicator value from a cumulative sum of absolute value of the difference value that is found.

Thus, the horizontal component can be found for each unit interval and the first indicator value can be found from the sum of absolute differences of the horizontal component. In the example of train and car, a characteristic difference appears in the horizontal component of the acceleration signal and therefore efficient discrimination can be made. Also, the processing to find the sum of absolute differences causes a lighter load than frequency conversion.

Another aspect of the invention is directed to an electronic apparatus including any of the state detecting devices described above.

Still another aspect of the invention is directed to a program causing a computer to function as an acquisition unit which acquires an x-axis component, a y-axis component and a z-axis component of an acceleration signal from an acceleration sensor, and an arithmetic unit which performs arithmetic processing. The arithmetic unit calculates a coordinate transformation matrix for finding an acceleration component in horizontal direction, from an average value of the x-axis component, an average value of the y-axis component and an average value of the z-axis component acquired by the acquisition unit, and discriminates between a first state where a person is in a first type of vehicle and a second state where the person is in a second type of vehicle that is different from the first type, based on the coordinate transformation matrix that is calculated and a first indicator value obtained from the x-axis component, the y-axis component and the z-axis component.

Yet another aspect of the invention is directed to a state detecting method including: acquiring an x-axis component, a y-axis component and a z-axis component of an acceleration signal from an acceleration sensor; calculating a coordinate transformation matrix for finding an acceleration component in horizontal direction, from an average value of the x-axis component, an average value of the y-axis component and an average value of the z-axis component that are acquired; and discriminating between a first state where a person is in a first type of vehicle and a second state where the person is in a second type of vehicle that is different from the first type, based on the coordinate transformation matrix that is calculated and a first indicator value obtained from the x-axis component, the y-axis component and the z-axis component.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment will be described. The following embodiment should not unduly limit the contents of the invention described in the accompanying claims. Not all parts of the configuration described in the embodiment are essential elements of the invention.

1. Technique of this Embodiment

First, a technique of this embodiment will be described. In a related art, a technique of determining whether an automobile is in motion or at a standstill is known. Also, a technique of discriminating whether a person is walking or in a vehicle is disclosed. Although there is a technique of discriminating which of automobile, bus, train and the like the person is in by using a microphone and the GPS as well as an acceleration sensor, there is a problem that the GPS cannot perform positioning in a subway or the like and that the microphone is strongly influenced by ambient noise. Consequently, determination error may occur. There is also a problem of large power consumption required by the use of the GPS and microphone. Therefore, a technique of discriminating between car and train based on a sensor signal from an acceleration sensor is used here.

Figure 1:
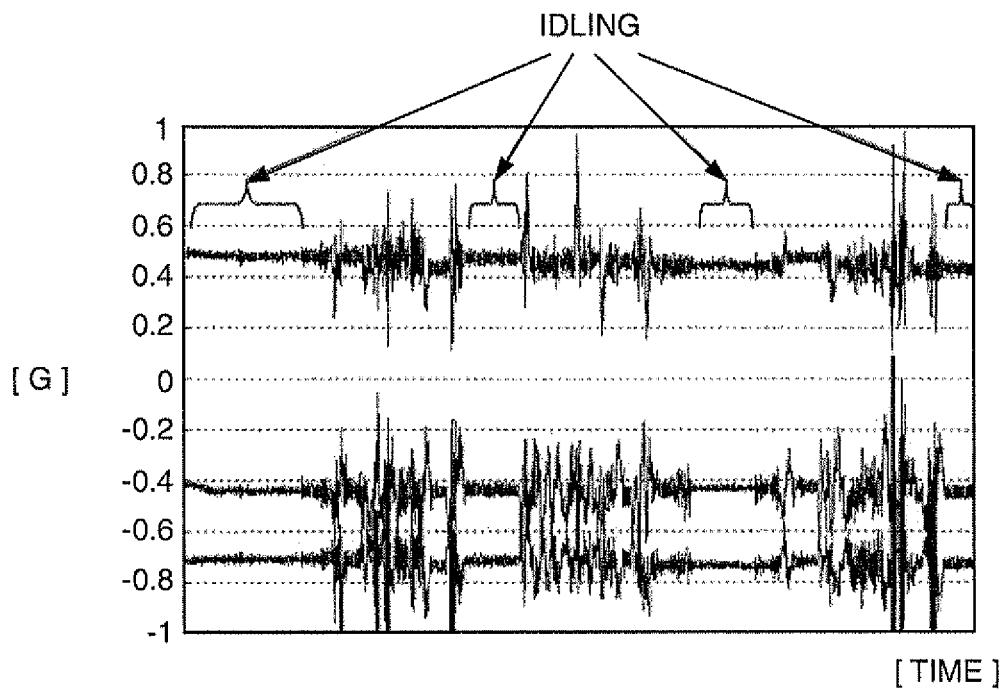
FIG. 1 illustrates a difference in acceleration signal on three axes between when a car is in motion and when a car is at a standstill.

As an example of discrimination using an acceleration sensor, a technique of discriminating each state, for example, "standstill", "walking", "car", and "train", is considered. Here, the standstill state may be a state where the person is in a vehicle which is not in motion, or may be a state where the person is not in a vehicle and is not moving, either. FIG. 1 shows an example of signal value of the acceleration sensor when the person is in a car. As shown in FIG. 1, the signal value changes greatly when the car is in motion, whereas the signal value changes little when the car is idling (at a standstill). Therefore, "car" and "standstill" can be discriminated. Similarly, it can be considered that "train" and "standstill" can be discriminated from each other.

Figure 2:
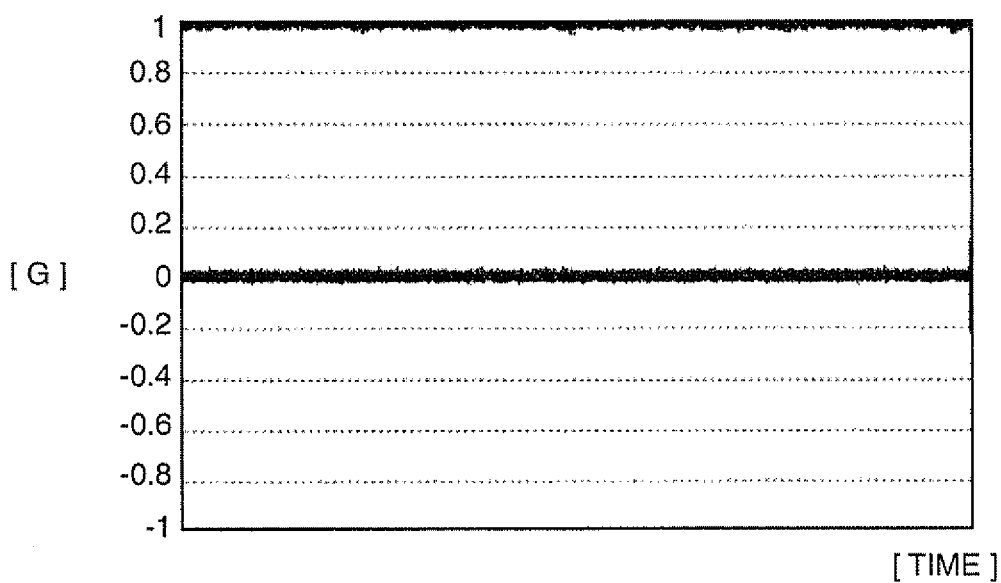
FIG. 2 shows an acceleration signal on three axes when a car is at a standstill (standing still).

The state where the person is not in a vehicle and is standing still (a state included in the standstill state) can be discriminated from the other states because the signal value is uniformly small, as shown in FIG. 2. Moreover, the walking state can be discriminated from the other states because of its characteristic that a large change in signal value appears periodically. The fact that the walking state can be discriminated can be understood also from the widespread distribution of pedometers.

Considering the above, since the "standstill" and "walking" can be discriminated from the other states, it then suffices that "car" and "train" can be discriminated from each other. As "car" and "train" can be discriminated from each other, the technique can be applied to fields such as dead reckoning. Dead reckoning refers to a position estimation technique using an inertial sensor or the like without using the GPS or the like. In this case, since an absolute position is difficult to acquire, a work of estimating and correcting accumulating errors is necessary. However, if whether the person is moving by car or by train is known, this can be used to estimate the errors. Specifically, if the person is discriminated as moving by train, it is presumed that a trajectory that traces positions on a railway track on a map is drawn. If the person is discriminated as moving by car, it is presumed that a trajectory that traces positions on a road on a map is drawn.

Figure 3:
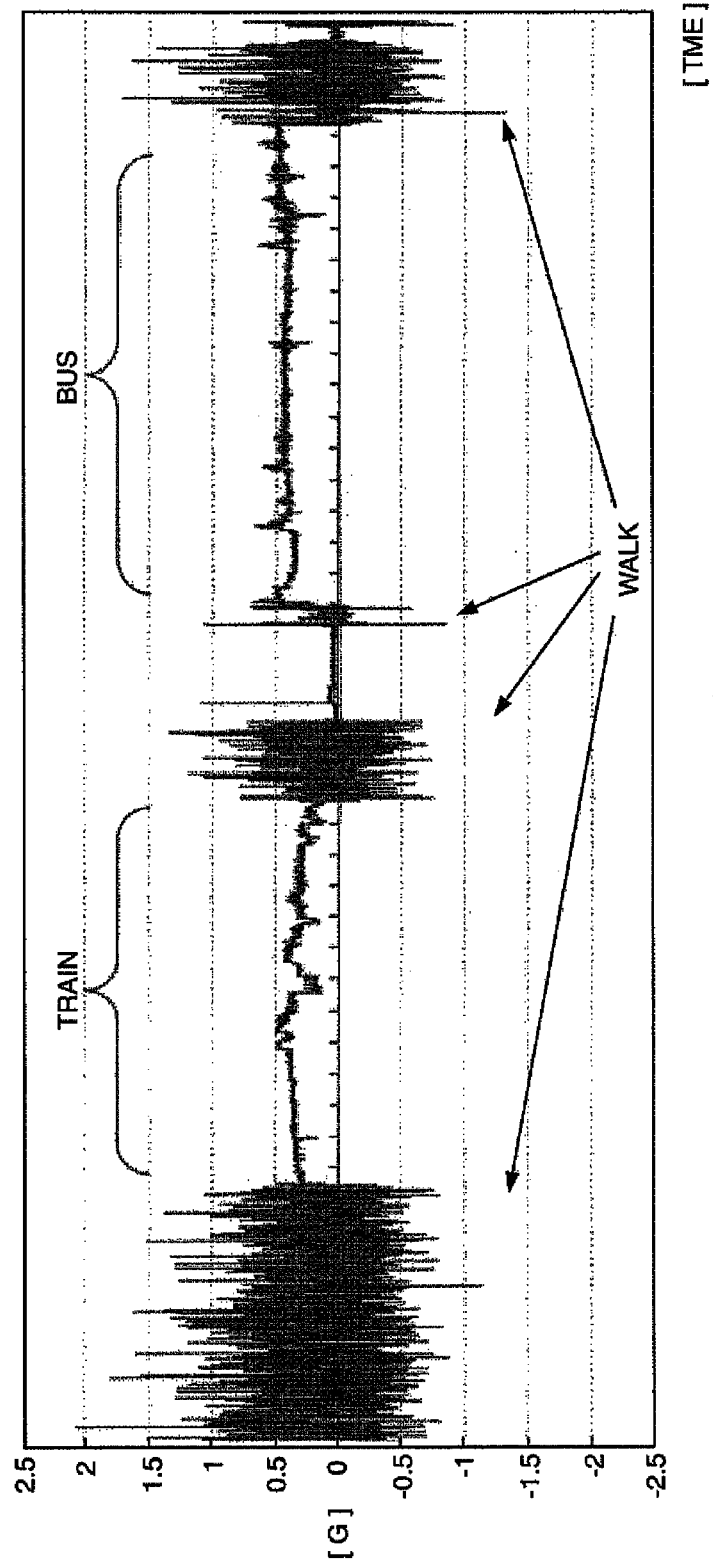
FIG. 3 illustrates a change in acceleration signal when walking, moving by train and moving by car are carried out.

Therefore, the present applicant proposes a technique of discriminating between a first state where the person is in a first vehicle (in a narrow sense, a car) and a second state where the person in a second vehicle (in a narrow sense, train), based on a sensor signal from an acceleration sensor. FIG. 3 shows a graph showing signal values from an acceleration sensor in the case where the person moves by train and by car. FIG. 3 also includes walking and standstill states as well train and car, and only the values on one axis of the three axes are used in order to facilitate understanding. As can be seen from FIG. 3, the signal value corresponding to the moving by car (bus) has larger changes than the signal value corresponding to the moving by train. This is due to quicker acceleration and deceleration of the car. This is also due to the fact that a car turns at larger angles than a train.

These differences can be discriminated by analyzing the frequency of the acceleration signal. In the case of train, a low frequency of approximately 1 to 3 Hz appears, whereas in the case of car, the number of revolutions of the engine directly appears in the frequency of the acceleration signal and therefore a higher frequency than in the case of train is shown. Therefore, these differences can also be discriminated by performing frequency conversion such as FFT (fast Fourier transform). However, frequency conversion requires many processing cycles. Moreover, when a high-frequency signal is handled, a high sampling rate needs to be set corresponding to the high frequency, leading to an increase in power consumption as a result. Thus, in this embodiment, discrimination is made without frequency conversion such as FFT.

In this embodiment, an indicator value that clearly indicates the difference in acceleration signal shown in FIG. 3 is calculated and discrimination is made based on the calculated indicator value. As the indicator value, first to third indicator values are used. The first indicator value is a value that indicates a change in acceleration in horizontal direction. The second indicator value is a value based on a comparison of two signal intensities. The third indicator value is a value using count error information in a number of steps detecting unit.

Hereinafter, after the description of an example of system configuration, characteristics of the first to third indicator values and a calculating method thereof will be described. Then, a technique of discriminating between the first state and the second state using the first to third indicator value will be described. In this embodiment, as described above, "walking" and "standstill" may be considered as well as "car" and "train", and these states will also be mentioned.

2. Example of System Configuration

Figure 4:
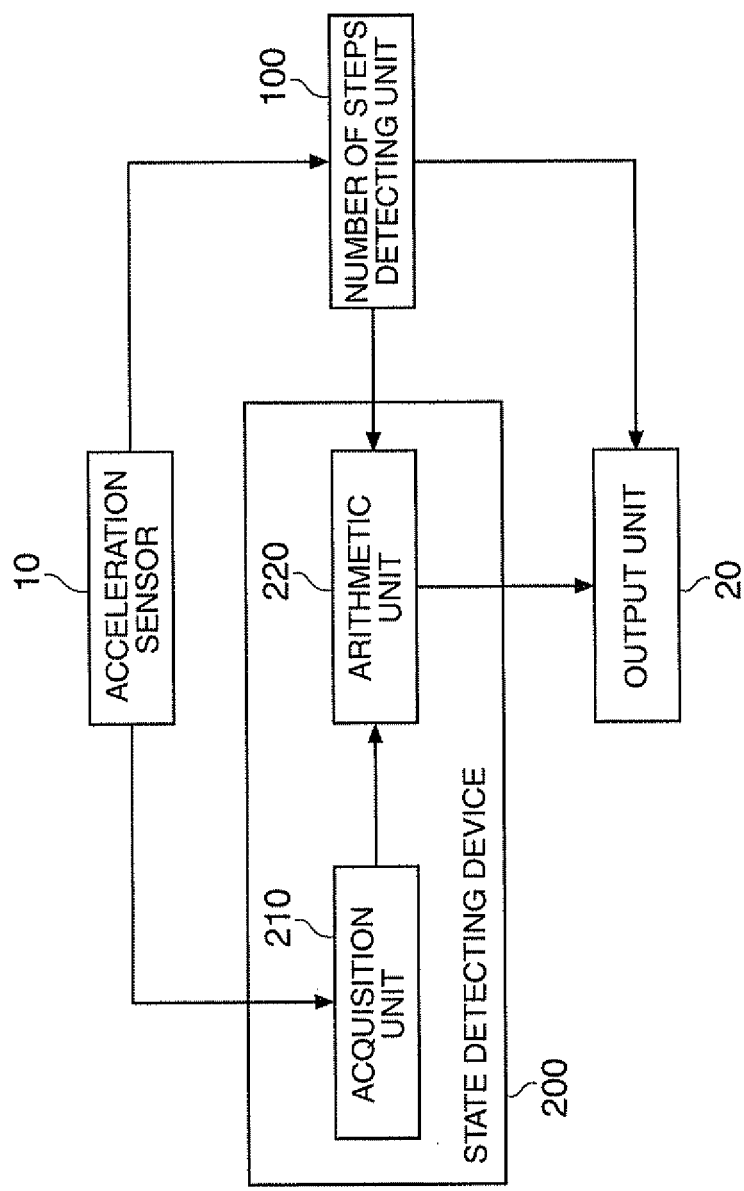
FIG. 4 shows an example of system configuration of an embodiment.

FIG. 4 shows an example of configuration of a detection system including a state detecting device of this embodiment. As shown in FIG. 4, a state detecting device 200 includes an acquisition unit 210 and an arithmetic unit 220. However, the device is not limited to the configuration of FIG. 4 and various modified embodiments are possible such as omitting one or some of the components or adding another component.

The acquisition unit 210 acquires an x-axis component, a y-axis component and a z-axis component of an acceleration signal from an acceleration sensor 10.

The arithmetic unit 220 calculates first to third indicator values based on the acceleration signal acquired by the acquisition unit 210 and count error information or the like detected by a number of steps detecting unit 100, and discriminates between a first state where the person is in a first type of vehicle and a second state where the person is in a second type of vehicle that is different from the first type, based on the calculated indicator values.

The configuration of the number of steps detecting unit 100 will be described in detail in the section describing the third indicator value. Although FIG. 4 shows that the number of steps detecting unit 100 is configured as a different unit from the state detecting device 200, the number of steps detecting unit 100 may be included in the state detecting device 200.

An output unit 20 performs processing to output a result of discriminating the state. For example, the output unit 20 may be a display unit formed by a liquid crystal panel or the like and may display the result of discrimination. Alternatively, the output unit 20 may be an interface with another system that performs processing using the result of discrimination.

3. Technique of Calculating Indicator Values

Next, characteristics of the first to third indicator values and a technique of calculating these indicator values will be described. Here, a data acquisition rate of 16 Hz (acquisition of 16 data on each axis per second) and a unit interval of one second are assumed. Twenty unit intervals (20 seconds) form a basic interval and state discrimination is carried out every basic interval. Then, a result of discrimination is outputted every three basic intervals (60 seconds). However, the unit interval, basic interval and the like are not limited to the above intervals. For example, a unit interval of two seconds (32 data) may be employed.

3.1 First Indicator Value

As shown in FIG. 3, acceleration and deceleration features differ between car and train. Therefore, if acceleration and deceleration features of car and acceleration and deceleration features of train which are gentle as compared with those of car can be expressed as numerical values, discrimination between car and train can be made.

For example, when N sampled values (N values for each of the x-axis, y-axis and z-axis components of the acceleration signal) are acquired, the following processing a to c may be performed to the acquired values.

a. Find an average value for each of the three axes.
    b. Find the sum of absolute differences between the sampled value and the average value for each of the three axes.
    c. Find the total of the sums of absolute differences for the three axes found in b.

Figure 5:
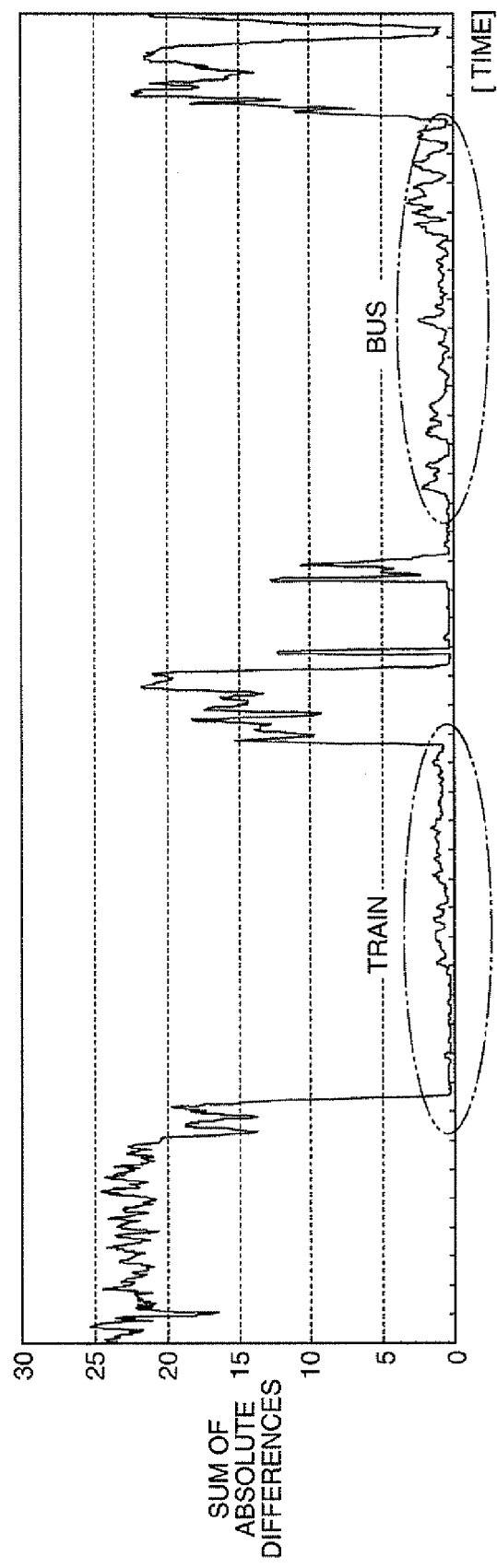
FIG. 5 illustrates a difference in sum of absolute differences of acceleration signal between train and bus (car).

The resulting values of the processing a to c are shown in FIG. 5. As is clear from FIG. 5, the difference is more conspicuous than in FIG. 3 and larger and more frequent changes are observed in the value for car (bus) than for train. Therefore, an indicator value for discriminating between train and car may be found based on these values. As an indicator value, the magnitude of a difference value from the average value (indicating the magnitude of amplitude), the number of times a change from a larger value than the average value to a smaller value (or from a smaller value to a larger value) occurs (the number of times the average value is crossed, indicating the frequency of change), or the like may be used. However, in this example, the sum of absolute differences between neighboring values is found. Thus, a small indicator value is obtained when there is a small change in value, and a large indicator value is obtained when there is a large change in value. That is, since an indicator value with a similar tendency to variance is obtained, it is expected that the vehicle is determined as a car when the indicator value is large, and that the vehicle is determined as a train when the indicator value is small.

In this embodiment, the first indicator value is calculated by the following technique with an improvement in consideration of exceptional conditions. First, acceleration caused by an impact of a collision or the like is excluded as an exceptional condition. For example, large acceleration may be detected because of a short-time impact caused by a collision with something. Also, even when there is no acceleration or deceleration, the occurrence of rotation causes a change in acceleration detected on each axis (gravitational acceleration 1G) and therefore a large amount of change is detected when three axes are observed separately. Such a change in acceleration should not be used to discriminate different vehicles. Therefore, if there is a change equal to or greater than a predetermined threshold value on one of the three axes, this value is excluded from the calculation of the indicator value.

The acceleration sensor also detects acceleration due to gravity. However, gravitational acceleration is constant whether the person moves by car or by train. That is, in order to detect the difference between train and car, comparing acceleration components other than gravitational acceleration is desirable. Thus, to remove as many acceleration components due to gravitational acceleration as possible, a coordinate transformation matrix is found. Here, the coordinate transformation matrix is found by finding an average value of N sampled values (for example, 16 values) on each axis in a certain unit interval (for example, the first unit interval in the basic interval) and then assuming the acceleration expressed by the average value that is found, as the direction of gravitational acceleration. The coordinate transformation matrix may be any matrix that is found by assuming the direction of gravity from the average value on each axis, and is not limited to a matrix that is decided based on the value in the unit interval. Specific processing to calculate the first indicator value is described as a' to d'.

a'. Find an average value on each of the three axes, of every N sampled values.
    b'. Find a coordinate transformation matrix, considering the found average value as gravity.
    c'. Perform coordinate transformation of each of the average values on the three axes, using the coordinate transformation matrix, and thus find horizontal components (XH, YH).
    d'. Calculate the cumulative sum of absolute differences of neighboring values for XH, YH.

The processing of a' to d' is expressed by the following equations (1) to (3). Here, a unit interval of one second is employed and 16 values ($x_1$ to $x_{16}$, $y_1$ to $y_{16}$, $z_1$ to $z_{16}$) are acquired in each unit interval. The coordinate transformation matrix is expressed as C. The letter i is an index that is added every unit interval. The letter j is an index that is added every basic interval.

$$\overline{X}_j = \frac{1}{16}\sum_{1}^{16} x_i \quad (1)$$

$$\overline{Y}_j = \frac{1}{16}\sum_{1}^{16} y_i$$

$$\overline{Z}_j = \frac{1}{16}\sum_{1}^{16} z_i$$

$$\begin{pmatrix} XH_j \\ YH_j \\ ZH_j \end{pmatrix} = C \begin{pmatrix} \overline{X}_j \\ \overline{Y}_j \\ \overline{Z}_j \end{pmatrix} \quad (2)$$

$$\text{First indicator value} = \sum_{1}^{19} (|XH_{j+1} - XH_j| + |YH_{j+1} - YH_j|) \quad (3)$$

Figure 6:
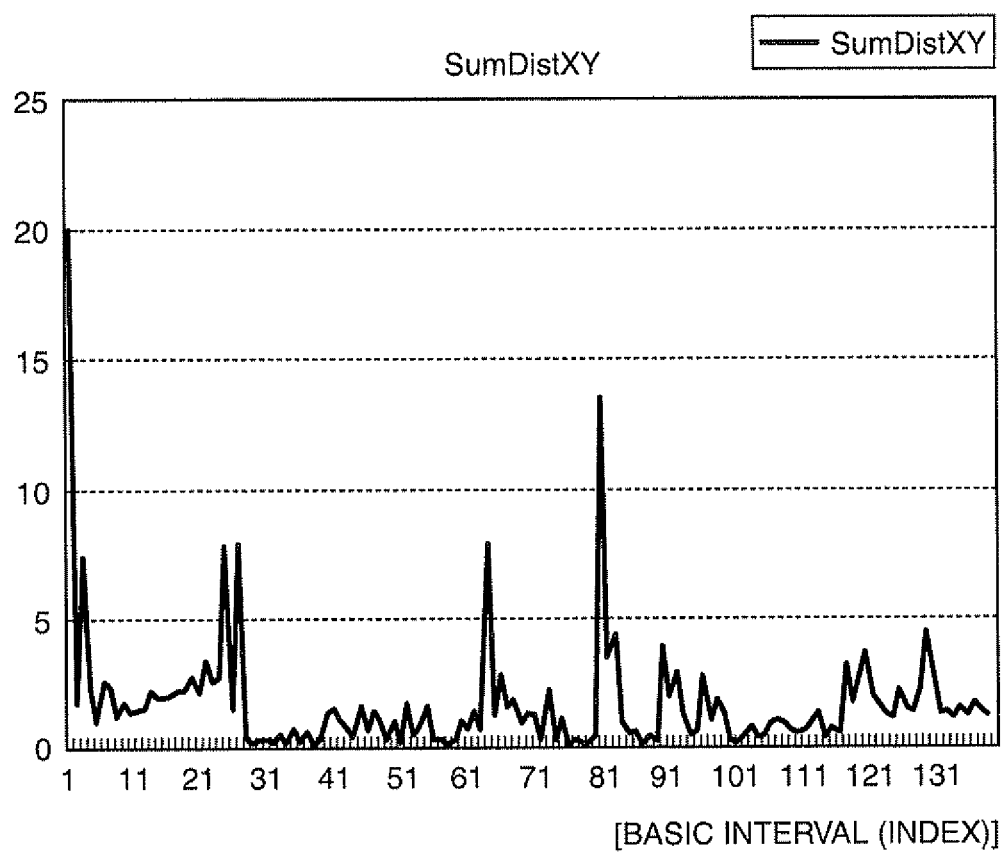
FIG. 6 shows an example of first indicator value.

An example of changes in numerical value of the first indicator value found by the equations (1) to (3) is shown in FIG. 6.

In the above processing c', coordinate transformation is performed to the average values on the three axes, but coordinate transformation is not limited to this example. For example, coordinate transformation may be performed to each of the N sampled values and XH or the like may be found from the average value of the resulting values. This is expressed by the following equations (4) and (5). Various other modifications can be made in the technique of calculating the first indicator value.

$$\begin{pmatrix} xh_i \\ yh_i \\ zh_i \end{pmatrix} = C \begin{pmatrix} x_i \\ y_i \\ z_i \end{pmatrix} \quad (4)$$

$$\begin{pmatrix} XH_j \\ YH_j \\ ZH_j \end{pmatrix} = \frac{1}{16} \begin{pmatrix} \sum_{1}^{16} xh_i \\ \sum_{1}^{16} yh_i \\ \sum_{1}^{16} zh_i \end{pmatrix} \quad (5)$$

3.2 Second Indicator Value

As described above, as the frequency of the acceleration signal, a low frequency of approximately 1 to 3 Hz appears in the case of train. However, in the case of car, the number of revolutions of the engine directly appears in the frequency of the acceleration signal and therefore a higher frequency than in the case of train is shown. Therefore, discrimination between car and train can be made by analyzing frequency characteristics.

In this embodiment, instead of performing frequency conversion with heavy processing such as FFT, an indicator value dependent on the frequency is found and used for discrimination by a simple technique. Specifically, a value based on a signal intensity without performing filter processing is used as a first feature quantity, and the signal intensity after passing through a band pass filter with a pass band of a low frequency (for example, 1 to 3 Hz) is used as a second feature quantity. Then, the ratio of the first feature quantity to the second feature quantity (second feature quantity/first feature quantity) is used as the second indicator value.

Here, the first feature quantity is a value based on the signal intensity in the entire frequency range because filter processing is not performed. On the other hand, the second feature quantity is obtained by passing through the band pass filter with the low-frequency pass band and therefore the second feature quantity is a value based on the signal intensity corresponding to the pass band. Here, the frequency of the pass band is set corresponding to a frequency band that is conspicuous in the acceleration signal in the case of moving by train. As the frequency is thus set, during the moving by train, many signal values concentrate on the low frequency (corresponding to the pass band of the band pass filter). Therefore, the value of the second feature quantity is close to the value of the first feature quantity and consequently the second indicator value is a value close to 1. Meanwhile, during the moving by car, signal values are distributed over high frequencies. Therefore, the second feature quantity is a smaller value than the first feature quantity and the second indicator is a smaller value than in the case of train.

Therefore, by providing such a configuration that the vehicle is likely to be determined as a train when the second indicator value is large and that the vehicle is likely to be determined as a car when the second indicator value is small, discrimination between train and car can be made.

As the first feature quantity, for example, the value of the sum of absolute differences between the signal intensities of acceleration and the average value of the signal intensities may be used. As the second feature quantity, for example, the sum of absolute values of values obtained by performing band pass filter processing to the signal intensities may be used.

Figure 7:
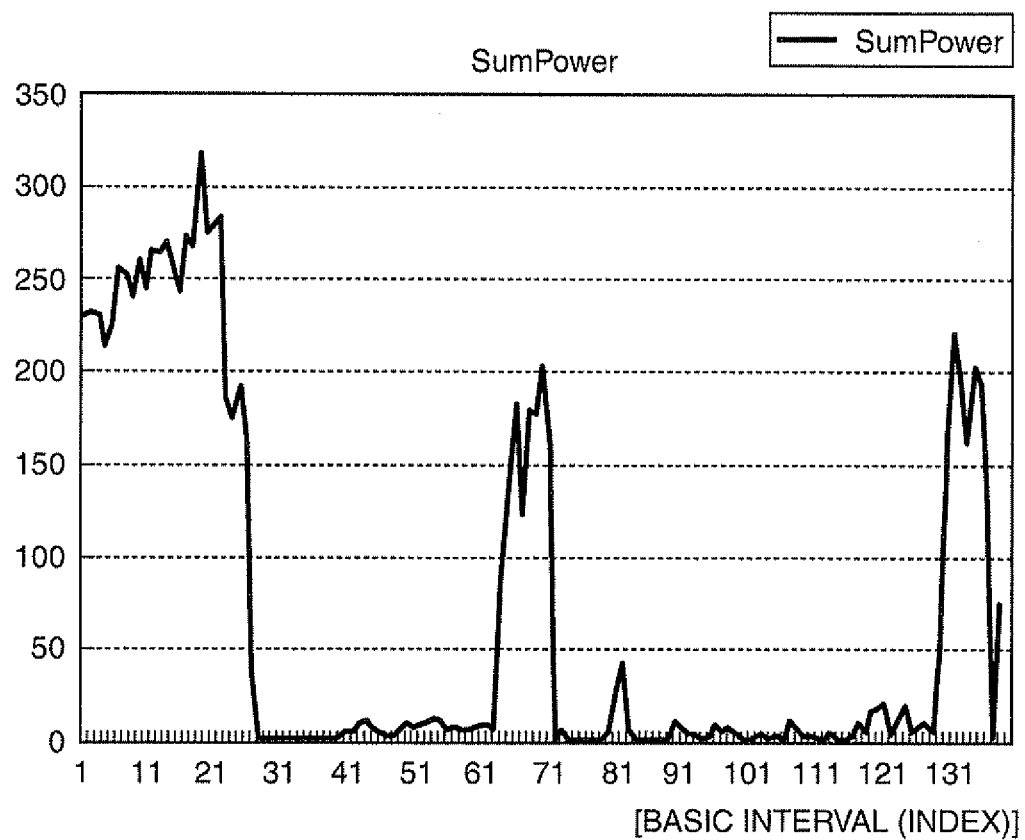
FIG. 7 shows an example of second feature quantity.

Therefore, if the first feature quantity is expressed as SumDistZ and the second feature quantity is expressed as SumPower, the values expressed by the following equations (6) to (8) may be used. An example of changes in numerical value of SumPower is shown in FIG. 7.

$$SumDistZ = \sum_{1}^{20}\sum_{i=1}^{16} |(x_i^2 + y_i^2 + z_i^2) - \mu| \tag{6}$$

$$\mu = \frac{1}{16}\sum_{i=1}^{16}(x_i^2 + y_i^2 + z_i^2) \tag{7}$$

$$SumPower = \sum_{1}^{20}\sum_{i=11}^{16} |f_{BPF}(x_i^2 + y_i^2 + z_i^2)| \tag{8}$$

3.3 Third Indicator Value

As the third indicator value, count error information of the number of steps in the number of steps detecting unit is used. In some cases, while moving by car or train, a pedometer may count vibrations due to the moving by vehicle as the number of steps. Therefore, whether the person in moving by vehicle or walking is determined, and if the person is determined as moving by vehicle, processing to restrain the number of steps counted as a count error is carried out. Generally, a greater number of count errors occur in the case of car than in the case of train.

Thus, in this embodiment, the number of count errors before being restrained is used as the third indicator value. By providing such a configuration that the vehicle is likely to be determined as a car when the third indicator value is large and that the vehicle is likely to be determined as a train when the third indicator value is small, discrimination between train and car can be made.

Figure 8:
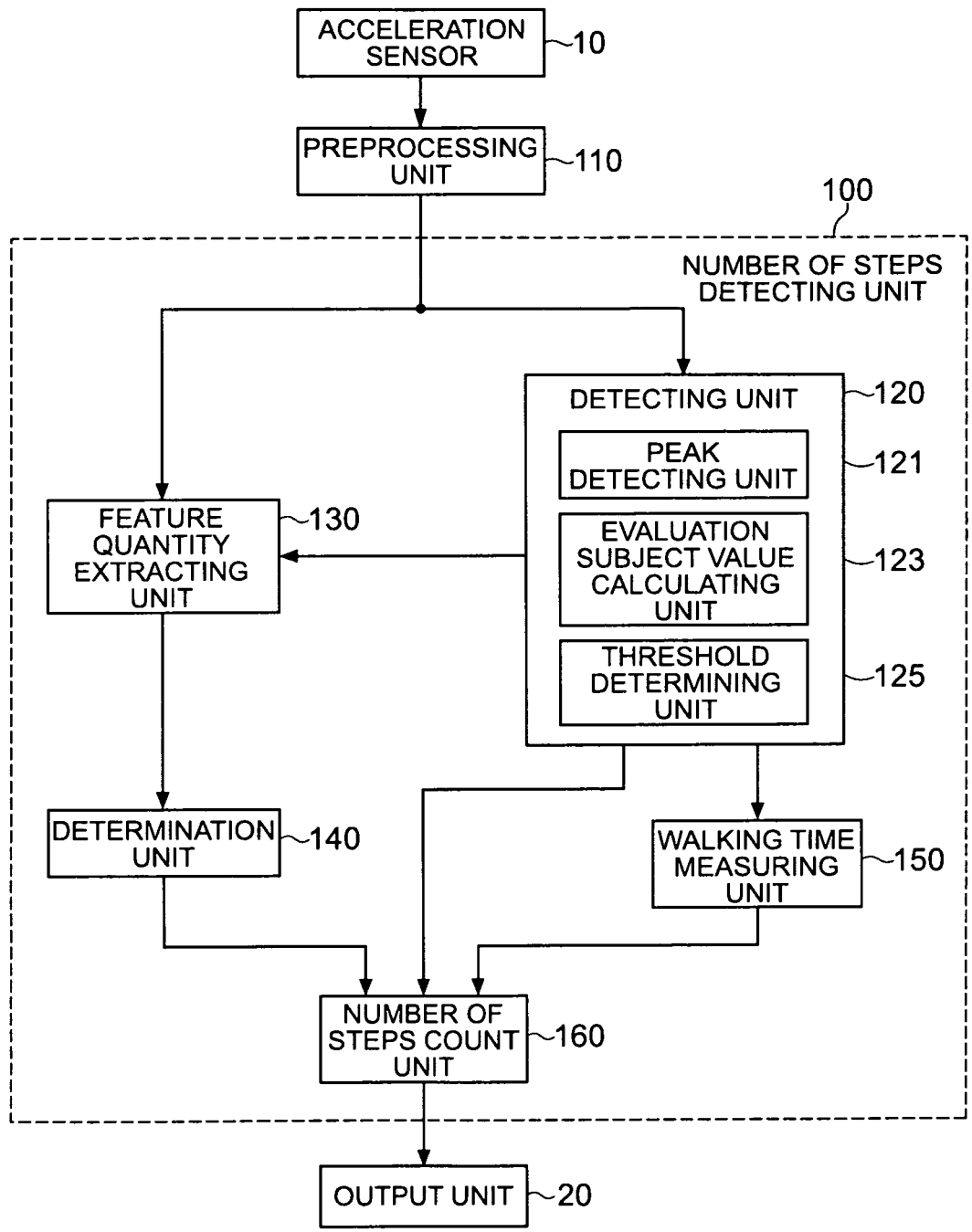
FIG. 8 shows an example of configuration of a number of steps detecting unit.

An example of configuration of the number of steps detecting unit is shown in FIG. 8. It is assumed that the number of steps detecting unit described here does not perform processing with heavy load such as frequency conversion including FFT or the like. The number of steps detecting unit 100 includes a detecting unit 120, a feature quantity extracting unit 130, a determination unit 140, a walking time measuring unit 150, and a number of steps count unit 160. However, the number of steps detecting unit 100 is not limited to the configuration of FIG. 8 and various modified embodiments are possible such as omitting one or some of the components or adding another component.

The detecting unit 120 performs number of steps detection processing. Here, the number of steps detection processing refers to, for example, processing to detect timing that is considered to be when walking, is done, based on a signal value after preprocessing. The detecting unit 120 includes a peak detecting unit 121, an evaluation subject value calculating unit 123, and a threshold determining unit 125. The peak detecting unit 121 detects a peak value from signal values after preprocessing. The evaluation subject value calculating unit 123 calculates an evaluation subject value used to detect the number of steps, from the signal value of the timing when the peak value is detected. The threshold determining unit 125 adaptively sets a threshold value and compares the set threshold value with the evaluation subject value, thus detecting the number of steps.

The feature quantity extracting unit 130 calculates a feature quantity to determine whether the person is moving by vehicle or not. The determination unit 140 determines whether the number of steps detected during an evaluation period is generated by moving by vehicle or not, based on the feature quantity calculated by the feature quantity extracting unit 130. The walking time measuring unit 150 measures the duration of walking. Here, the duration of waling refers to a time period during which walking is continuously detected. The number of steps count unit 160 counts the number of steps. In the number of steps detection processing by the detecting unit 120, whether the person is moving by vehicle or not is not particularly determined. Whether to reflect the result of the number of steps detection on the number of steps displayed on the number of steps display unit 20 or not, is decided by the number of steps count unit 160 in consideration of the result of the determination by the determination unit 140.

The detecting unit 120 compares a trough (or a peak) of the acceleration signal with a predetermined threshold value, and detects the trough or peak as the number of steps if the trough or peak exceeds the threshold value. However, since the detected number of steps is not necessarily entirely due to walking, the feature quantity is found and whether the detected number of steps is due to walking or not is determined by the determination unit 140.

As the feature quantity, the use of a double integral signal of the acceleration signal may be considered. In the case of walking, the acceleration signal and the double integral signal thereof are substantially in a relation of reverse phase in the same period. However, in the case of moving by vehicle or the like, there is no such relation and therefore discrimination can be made. Also, a variance in stride period (variance value) may be used as the feature quantity. walking is a periodic motion and therefore the period is substantially constant, whereas moving by vehicle includes many random components and large fluctuations in frequency. Therefore, discrimination can be made. Moreover, noise levels may be used as the feature quantity. As noise, a signal value or the like in the case where a trough is detected but is not detected as the number of steps is used. If a high signal value appears even when walking does not take place, it can be considered that this signal value is likely to be due to noise. If the noise level is high, it can be considered that detection of the number of steps in the peripheries is likely to be a detection error due to an element other than walking.

As a result of a determination based on the feature quantity as described above, a count that is detected as the number of steps by the detecting unit 120 but is not finalized by the number of steps count unit 160 (a value that is counted by a temporary counter but is reset without being committed) is generated. This is equivalent to the restrained count error that is mentioned in this embodiment. As the count error information that functions as the third indicator value, the number of count errors can be used as it is.

4. Determination Technique

As the first to third indicator values are found, whether the vehicle is a train or car is determined using the indicator values that are found. As described above, the vehicle is more likely to be determined as a car when the first and third indicator values are larger, whereas the vehicle is more likely to be determined as a train when these indicator values are smaller. As for the second indicator value, the vehicle is more likely to be determined as a train when the second indicator value is larger, whereas the vehicle is more likely to be determined as a car when the second indicator value is smaller. Determination is made using the three indicator values in a way that satisfies these conditions. The determination is made once every basic interval. An example is shown by the following formula (9).

$$\text{Second indicator value} - (\text{third indicator value}/8) - (\text{first indicator value}/4) > 0.7 \quad (9)$$

If the formula (9) holds, the vehicle is determined as a train. If the formula does not hold, the vehicle is determined as a car. The left side of the formula (9) becomes larger if the second indicator value is larger and the first and third indicator values are smaller. Therefore, based on the characteristics of the first to third indicator values, the left side is larger if the vehicle is expected to be a train and the condition of the left side being greater than 0.7 easily holds.

Figure 9:
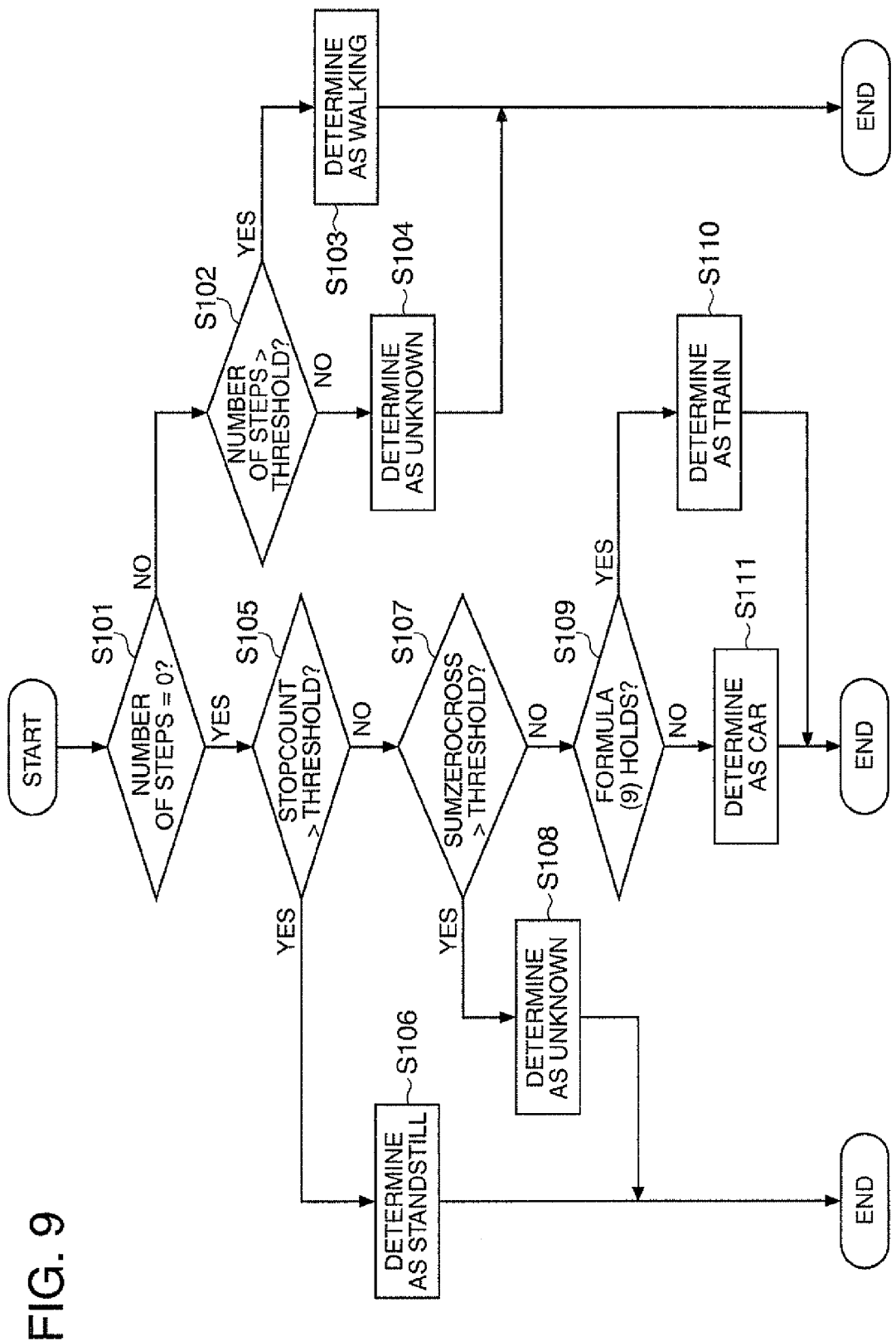
FIG. 9 is a flowchart for explaining state detection processing of an embodiment.

However, the determination in this embodiment is not limited to discrimination between car and train and may be discrimination between walking and standstill. The determination technique of this embodiment will be described with reference to the flowchart of FIG. 9.

As this processing starts, first, whether the count on the pedometer (the count after the count error is restrained) is 0 is determined (S101). If the number of steps is not 0, whether the number of steps is larger than a threshold value is then determined (S102). If the number of steps is larger than the threshold value, the state is determined as walking (S103). If the number of steps is smaller, the state is determined as unknown (S104). The processing then ends. Here, the reason for determining the state as unknown is because, while the state is likely to be walking state as the number of steps is detected by the pedometer, the number of steps is too small compared with the determination time and this presents an unnatural state for walking. That is, since a determination with a high degree of reliability cannot be made, determining the state as unknown and suspending the processing based on the result of state discrimination or the like, rather than forcing the finalization of the state as walking, standstill or the like, is likely to contribute to stable operation of the system.

If the number of steps is 0 in S101, whether a feature quantity StopCount is larger than a threshold value is determined in S105. Here, StopCount is a value calculated based on the difference between a maximum value and a minimum value on each axis in the unit interval. For example, StopCount may have an initial value of 0 (initialized when the basic interval starts) and may be incremented when the difference between the maximum value and the minimum value is equal to or smaller than a predetermined threshold value. That is, since StopCount indicates that there is a small change in value, the state is determined as standstill if StopCount is larger than the threshold value (S106).

If the result is No in S105, whether a feature quantity SumZerocross is larger than a threshold value is determined in S107. Here, SumZerocross is obtained by finding the number of times the value on each axis crosses the average value in the unit interval (the number of times a change from a smaller value than the average value to a larger value occurs the number of times a change from a larger value than the average value to a smaller value occurs) and then adding up this number of times to cover the basic interval (for example, to cover 20 unit intervals). If the number of times the crossing occurs is large, an unstable state where there is much noise or the like is supposed. Therefore, if the result is Yes in S107, the state is determined as unknown (S108) and the processing ends.

If the result is No in S107, whether the formula (9) holds is determined in S109. If the formula holds as described above, the vehicle is determined as a train (S110). If the formula does not hold, the vehicle is determined as a car (S111).

The above is a determination method carried out every basic interval. However, it is considered that the state detecting device generates an output every 60 seconds, as described above (though not limited to this, of course). That is, three determination results are obtained for one output. Therefore, three determination results may be used to carry out determination by majority decision so as to decide the state to be outputted. For example, if the three results coincide with each other, the state indicated by the results is outputted. If two results coincide with each other, the state indicated by these results is outputted. If the three results are different from each other, a preset state with a high degree of reliability is selected. Specifically, since the detection of the number of steps has a high degree of reliability, if one of the three determination results that are different from each other indicates walking, it is considered that the state to be outputted can be the walking. Also, even if two results coincide with each other, this coincident state need not be outputted. For example, if the remaining one result indicates walking and is the latest result or the like, this determination on walking is considered highly reliable and therefore the output result can be the walking. As the technique thereof, various modified embodiments are possible.

In this embodiment, the state detecting device 200 includes the acquisition unit 210 and the arithmetic unit 220, as shown in FIG. 4. The acquisition unit 210 acquires an x-axis component, a y-axis component and a z-axis component of an acceleration signal from the acceleration sensor 10. The arithmetic unit 220 calculates a coordinate transformation matrix from the average values of x-axis components, of y-axis components and of z-axis components that are acquired. Then, a first indicator value is found based on the coordinate transformation matrix, the x-axis component, the y-axis component and the z-axis component. A first state and a second state are discriminated from each other based on the first indicator value that is found.

Here, the coordinate transformation matrix is a matrix for coordinate transformation. If the direction of a vector expressed by each of the average values of the x-axis components, of the y-axis components and of the z-axis components is regarded as a direction of gravity, coordinate transformation is performed in such a way that one axis (for example, the z-axis after coordinate transformation) of reference axes becomes coincident with the direction of gravity while the two axes orthogonal thereto (for example, the x-axis and y-axis after coordinate transformation) become coincident with horizontal directions. The first state refers to a state where the person is moving by a first type of vehicle. The second state refers to a state where the person is moving by a second type of vehicle that is different from the first type.

Thus, as the coordinate transformation matrix for performing coordinate transformation in consideration of the direction of gravity is found, which vehicle the person is moving by can be discriminated, using the first indicator value that is found based on the coordinate transformation matrix, the x-axis component, the y-axis component and the z-axis component. For example, in the case of discriminating between car and train, a characteristic difference in the acceleration signal appears in a horizontal component, and for both vehicles, the same gravitational acceleration acts on a vertical component (direction of gravity). Therefore, in such case, the first indicator value may be found using the horizontal component after coordinate transformation, as described above. However, the technique is not limited to the horizontal component. For example, in the case of discriminating a vehicle where a feature appears in gravitational acceleration, such as aircraft, a vertical component may be used.

The arithmetic unit 220 may find a first feature quantity based on the signal intensity of the acceleration signal. Here, the signal intensity of the acceleration signal is obtained, for example, from the x-axis component, the y-axis component and the z-axis component. Moreover, band pass filter processing may be performed to the signal intensity to find a second feature quantity, and a second indicator value may be found based on the first feature quantity and the second feature quantity. Then, the first state and the second state are discriminated from each other based on the first indicator value and the second indicator value.

Thus, the state can be detected using the second indicator value that is found based on the signal intensity of the acceleration signal, in addition to the first indicator value, and detection accuracy can be improved. The first feature quantity is a value based on the signal intensity of the acceleration signal itself, whereas the second feature quantity is obtained by performing band pass filter processing to the signal intensity. That is, the first feature quantity corresponds to the signal intensity over the entire frequency band, whereas the second feature quantity corresponds to the signal intensity at the frequency of the pass band of the band pass filter. As described above, in the case of moving by train, a lower frequency than in the case of moving by car appears in the acceleration signal. As the second indicator value is found using the first feature quantity and the second feature quantity, the difference in frequency characteristics of the acceleration signal between different vehicles can be detected. In this detection, since band pass filter processing is carried out instead of frequency conversion such as FFT, the processing load is light. Moreover, since the sampling rate need not be increased, there is no increase in power consumption.

The arithmetic unit 220 may also find the second indicator value from the ratio of the first feature quantity to the second feature quantity.

Thus, the second indicator value can be found using the ratio of two feature quantities. For example, if the first feature quantity is SumDistZ and the second feature quantity is SumPower, (SumPower/SumDistZ) can be used as the second indicator value. Since the second feature quantity is a value based on the signal intensity after band pass filter processing is carried out as described above, it can be considered that the value of the second feature quantity differs between car and train, depending on the characteristics of the band pass filter. For example, if the pass band of the band pass filter is made to correspond to a frequency band that characteristically appears in the case of moving by train, the second feature quantity should be large when the person is moving by train, and the second feature quantity should be small when the person is moving by car. However, the absolute value of the second feature quantity varies depending on the magnitude of the overall signal value and therefore the relation of train>car does not necessarily hold. Thus, the ratio to the first feature quantity corresponding to the signal intensity of the entire frequency band is calculated and a relative value of the signal value in the pass band in relation to the overall signal value is found and used as the second indicator value. In the above example, the signal intensity in the case of train is expected to concentrate at the pass band and therefore the second indicator value is close to 1, whereas the signal intensity in the case of car is distributed in a high frequency band and therefore the second indicator value is smaller than in the case of train.

The arithmetic unit 220 may also find the signal intensities of N acceleration signals from N x-axis components, N y-axis components and N z-axis components and find a first feature quantity from each of the N signal intensities and the sum of absolute differences between the signal intensities and the average value. Then, a second feature quantity may be found based on the sum of absolute values of values obtained by performing band pass filter processing to the N signal intensities.

Thus, the processing as expressed by the equations (6) to (8) is possible. In finding the first feature quantity, the sum of absolute differences between the signal intensities and the average value is calculated and therefore a value having a characteristic that is mathematically similar to variance is obtained and this value corresponds to a principal vibrational component included in the signal value. In finding the second feature quantity, the difference from the average value is not particularly calculated, but this is because a DC component of the signal is removed by performing band pass filter processing.

The arithmetic unit 220 may also perform processing to implement a band pass filter with a pass band including 1 to 3 Hz, as the band pass filter processing.

Figure 10:
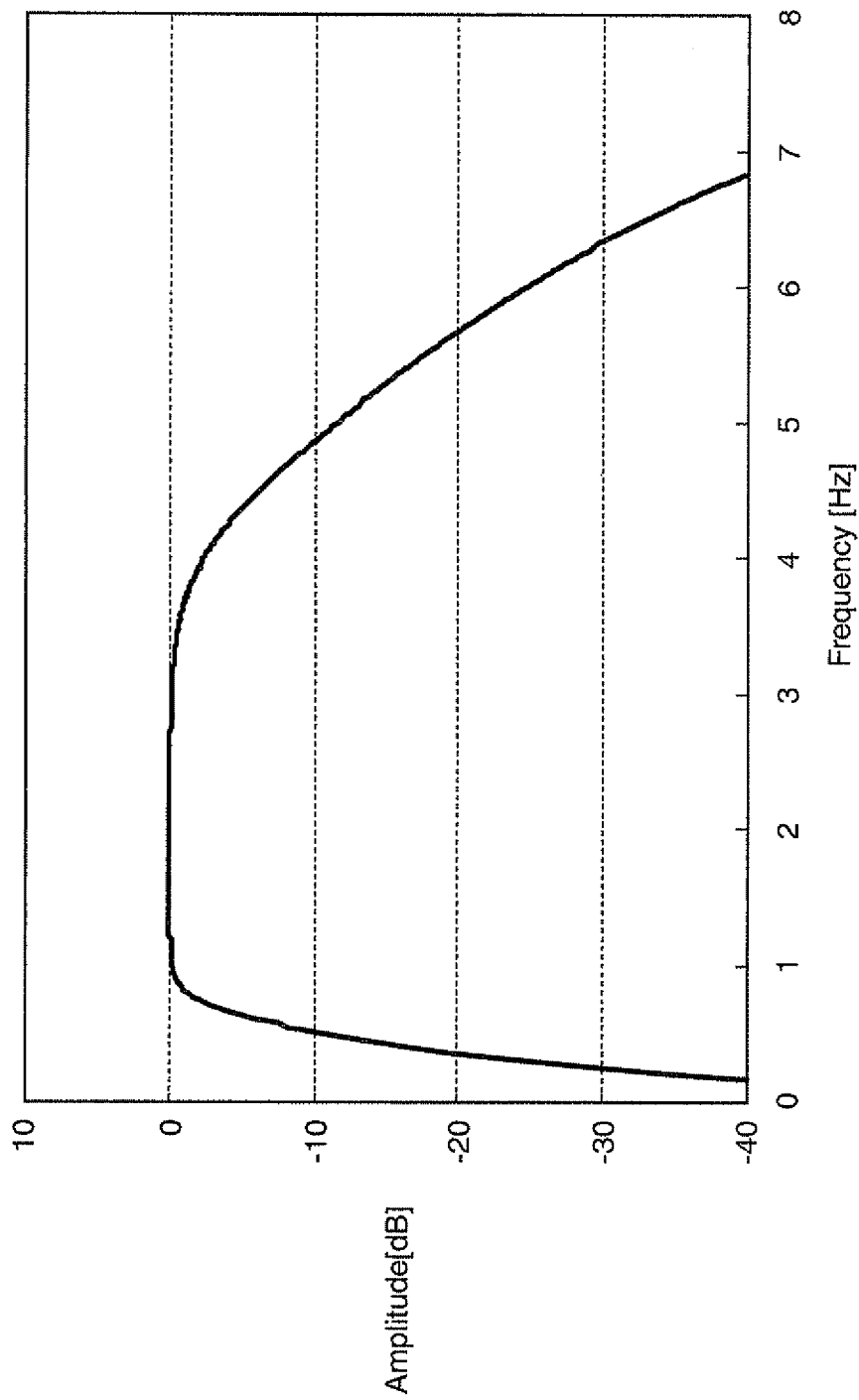
FIG. 10 shows an example of frequency characteristic of a band pass filter.

Thus, processing to pass the frequency band that characteristically appears in the acceleration signal in the case of moving by train can be carried out as the band pass filter processing, and the second indicator value can be varied to a degree that discrimination between train and car can be made. FIG. 10 shows an example of frequency characteristic of a filter used for the band pass filter processing. The filter of FIG. 10 passes a signal with a frequency of 0.5 to 5 Hz, and passes a signal of 1 to 3 Hz particularly well. That is, the band pass filter used in this embodiment may be a filter having a lower limit of the pass band at a value between 0.5 and 1 Hz and an upper limit of the pass band at a value between 3 and 5 Hz. However, characteristics of the filter are not limited to this. For example, if the upper limit of the pass band is raised, the difference in the second indicator value between car and train is expected to decrease. However, the upper limit of the pass band may be raised to a limit where a difference that enables discrimination between car and train is obtained. That is, the upper limit of the pass band may be higher than 5 Hz as long as there is a difference in the second indicator value between car and train.

The arithmetic unit 220 may also find a third indicator value based on count error information indicating the degree of count errors from the number of steps detecting unit 100. Here, the count error information may refer to number of steps detection information in the number of steps detecting unit 100 in the case where the current state is determined as not the walking state. Then, the first state and the second state are discriminated from each other based on the first to third indicator values.

Thus, the state can be detected based on the information in the number of steps detecting unit 100. The number of steps detecting unit 100 used for a pedometer or the like detects the number of steps based on fluctuations in acceleration due to walking. However, the number of steps detecting unit 100 may erroneously detect the number of steps, based on a change in acceleration generated in moving by vehicle. With a pedometer according to a related art, a technique for restraining such a count error is known. In the above example, the fact that the person is in a vehicle is detected based on plural feature quantities, and if moving by vehicle is detected, the detected number of steps is reset without being counted. That is, whether the detected number of steps is an error or not can be discriminated and therefore the number of times the erroneous number of steps is detected may be used as the count error information. Generally, the number of count errors is greater in the case of car than in the case of train. Therefore, for example, if the number of count errors is used as it is as the third indicator value, the vehicle is more likely to be determined as a car if the third indicator value is larger, and the vehicle is more likely to be determined as a train if the third indicator value is smaller.

Although an example of configuration of the number of steps detecting unit 100 is shown in FIG. 8, the configuration is not limited to this. In FIG. 8, the number of steps detecting unit 100 includes the determination unit 140, which determines whether the person is moving by vehicle or not. However, if the number of steps detecting unit 100 is used together with the state detecting device 200 according to this embodiment, the arithmetic unit 220 of the state detecting device 200 may detect the moving by vehicle. Since the arithmetic unit 220 may discriminate between "walking" and "standstill" as well as between "train" and "car" as described above, the arithmetic unit 220 can carry out the processing carried out by the determination unit 140. In some cases, the arithmetic unit 220 may also carry out the processing carried out by the feature quantity extracting unit 130. In this embodiment, it is possible that the state detecting device 200 and the number of steps detecting unit 100 are installed integrally in an electronic apparatus, as described later. In such case, the configuration can be simplified by causing the arithmetic unit 220 to determine whether the current state is the walking state or not.

The arithmetic unit 220 may also find the first indicator value based on the coordinate transformation matrix, the average value of x-axis components, the average value of y-axis components and the average value of z-axis components.

Thus, the first indicator value can be found based on the coordinate transformation matrix and the average value on each axis. Therefore, for example, the processing expressed by the equations (1) and (2) is possible. Since the average value is used, instead of using a value based on the signal intensity as in the case of the second indicator value, the indicator value that directly uses the difference in the waveform of the acceleration signal as shown in FIG. 3 can be found. That is, it can also be said that the first indicator value is an indicator value for discriminating a difference in acceleration and deceleration between car and train.

If an interval where N x-axis components, N y-axis components and N z-axis components are acquired is taken as a unit interval, the arithmetic unit 220 may also find an i-th horizontal component based on the coordinate transformation matrix and the x-axis component, y-axis component and z-axis component in an i-th unit interval, and may find an (i+1)th horizontal component based on the coordinate transformation matrix and the x-axis component, y-axis component and z-axis component in an (i+1)th unit interval. Then, the difference value between the i-th horizontal component and the (i+1)th horizontal component is found and the first indicator value is found from the cumulative sum of absolute values of the difference values that are found.

Thus, the processing as expressed by the equation (3) is possible. The horizontal component found from the coordinate transformation matrix changes largely and frequently in the case of car but changes gently in the case of train (a similar tendency to FIG. 5 occurs, though coordinate transformation is not carried out in FIG. 5). To express this difference numerically, here, the absolute value of the difference between horizontal components in neighboring unit intervals is taken and added up until the basic interval is covered (for example, 20 unit intervals). In the case of car, where the value changes largely and frequently, the absolute value of difference between the neighboring values is large. In the case of train, where the value changes gently, the absolute value of difference is small. Therefore, using the technique of this embodiment, the first indicator value that has a large value in the case of car and a small value in the case of train can be acquired. The technique of finding the indicator value from the values of horizontal components is not limited to the sum of absolute differences. Any technique that enables discrimination between car and train may be employed. For example, an amplitude value in the case where the average value is used as a reference (the magnitude of value is detected), the number of times the average value is crossed (the frequency of change is detected) or the like can be used.

This embodiment also relates to an electronic apparatus including the above state detecting device.

Thus, an electronic apparatus including the state detecting device can be realized. Specifically, it is conceivable that such an electronic apparatus is realized, for example, as a portable device installed on the user's body (including the case where the device is placed in a pocket). The electronic apparatus may include another device which performs processing using a result of detection by the state detecting device. For example, the electronic apparatus may be used for estimation in dead reckoning as described above. If the portable device has a display unit, the result of position estimation may be displayed on the display unit.

The embodiment also relates to a program which causes a computer to function as the acquisition unit 210 and the arithmetic unit 220. The acquisition unit 210 acquires an x-axis component, a y-axis component and a z-axis component of an acceleration signal from the acceleration sensor 10. The arithmetic unit 220 calculates a coordinate transformation matrix from the average values of x-axis components, of y-axis components and of z-axis components that are acquired. Then, a first indicator value is found based on the coordinate transformation matrix, the x-axis component, the y-axis component and the z-axis component. Based on the first indicator value that is found, a first state and a second state are discriminated from each other.

Thus, the processing of the embodiment can be realized in the form of software. For example, this software may be a program installed on a portable device such as a smart phone. Some smart phones according to a related art include an acceleration sensor. Therefore, the software may be installed as a program (which is assumed to be distributed particularly in the form of a mobile application) to perform the above processing using a sensor signal from the acceleration sensor. The program is recorded on an information storage medium. Here, the information storage medium may be various recording media that can be read by an information processing device, a portable device and the like, including optical discs such as DVD and CD, magneto optical disc, hard disk (HDD), and memories such as non-volatile memory and RAM. For example, it is conceivable that the program is stored on a storage medium (for example, card-type memory or the like) readable by a smart phone and is executed by the CPU of the smart phone.

The embodiment is described above in detail. However, those skilled in the art will be able to understand easily that a number of modifications can be made without substantially departing from novel features and effects of the invention. Therefore, such modifications are considered to be included in the scope of the invention. For example, a term that is described along with a different term with a broader meaning or the same meaning at least once in the specification or drawings can be replaced with that different term. Also, the configurations and operations of the state detecting device, the electronic apparatus and the like are not limited to the configurations and operations described in the embodiment and various modified embodiments thereof are possible.

What is claimed is:

1. A state detecting device comprising:
   a telephone including an acceleration sensor;
   an acquisition unit which acquires an x-axis component, a y-axis component and a z-axis component of an acceleration signal from the acceleration sensor; and
   an arithmetic unit which performs arithmetic processing;
   the arithmetic unit:
      calculating a coordinate transformation matrix for removing acceleration components due to gravitational acceleration, the coordinate transformation matrix being calculated from an average value of the x-axis component, an average value of the y-axis component and an average value of the z-axis component acquired by the acquisition unit, and
      calculating a first indicator value based on the coordinate transformation matrix, the x-axis component, the y-axis component and the z-axis component, the first indicator value being a value that indicates a change in acceleration in the horizontal direction,
      finding a first feature amount based on an amplitude of the acceleration signal,
      performing band pass filter processing of N amplitudes of the acceleration signal to find a second feature amount, N being an integer greater than 1, finding a second indicator value from the first feature amount and the second feature amount, wherein
      a value based on an amplitude without performing filter processing is used as the first feature amount, and a value based on an amplitude after passing through a band pass filter with a pass band of a frequency of 1 to 3 Hz is used as the second feature amount, and
      the ratio of the first feature amount to the second feature amount is used as the second indicator value, and
      discriminating between a first state where a person is in a first type of vehicle and a second state where the person is in a second type of vehicle that is different from the first type, based on the first indicator value and the second indicator value.

2. The state detecting device according to claim 1, wherein the arithmetic unit finds the second indicator value from a ratio of the first feature amount to the second feature amount.

3. The state detecting device according to claim 2, wherein the arithmetic unit:
   finds the N amplitudes of the acceleration signal from N sampled values of the x-axis component, N sampled values of the y-axis component and N sampled values of the z-axis component, and finds the first feature amount from a sum of absolute differences between each amplitude of the N amplitudes and an average value of the amplitudes, and
   finds the second feature amount from a sum of absolute values of values obtained by performing the band pass filter processing of the N amplitudes.

4. The state detecting device according to claim 1, wherein the arithmetic unit performs processing to implement the band pass filter with the pass band including 1 to 3 Hz, as the band pass filter processing.

5. The state detecting device according to claim 1, wherein the arithmetic unit finds a third indicator value based on count error information indicating a degree of count error from a number of steps detecting unit, which is configured to detect a number of walking steps, and discriminates between the first state and the second state based on the first indicator value, the second indicator value and the third indicator value.

6. The state detecting device according to claim 5, wherein the arithmetic unit finds the third indicator value by using, as the count error information, number of steps detection information in the number of steps detecting unit in the case where a current state is determined as not a walking state.

7. The state detecting device according to claim 1, wherein the arithmetic unit finds the first indicator value based on a cumulative sum calculated using values obtained from a coordinate transformation of the average value of the x-axis component, the average value of the y-axis component and the average value of the z-axis component by using the coordinate transformation matrix.

8. The state detecting device according to claim 1, wherein when an interval in which N sampled values of the x-axis component, N sampled values of the y-axis component and N sampled values of the z-axis component are acquired, is a unit interval, the arithmetic unit:
finds an i-th horizontal component from the coordinate transformation matrix and the x-axis component, the y-axis component and the z-axis component in an i-th (i being an integer equal to or greater than 1) unit interval, and finds an (i+1)th horizontal component from the coordinate transformation matrix and the x-axis component, the y-axis component and the z-axis component in an (i+1)th unit interval that is next to the i-th unit interval, and
finds a difference value between the i-th horizontal component and the (i+1)th horizontal component that are obtained, and finds the first indicator value from a cumulative sum of absolute values of the difference value that is found.

9. An electronic apparatus comprising the state detecting device according to claim 1.

10. An electronic apparatus comprising the state detecting device according to claim 2.

11. An electronic apparatus comprising the state detecting device according to claim 3.

12. An electronic apparatus comprising the state detecting device according to claim 4.

13. An electronic apparatus comprising the state detecting device according to claim 5.

14. An electronic apparatus comprising the state detecting device according to claim 6.

15. An electronic apparatus comprising the state detecting device according to claim 7.

16. An electronic apparatus comprising the state detecting device according to claim 8.

17. A non-transitory computer-readable medium having a program embedded therein, the program causing a computer to function as:
an acquisition unit which acquires an x-axis component, a y-axis component and a z-axis component of an acceleration signal from an acceleration sensor included in a telephone; and
an arithmetic unit which performs arithmetic processing, the arithmetic unit:
calculating a coordinate transformation matrix for removing acceleration components due to gravitational acceleration, the coordinate transformation matrix being calculated from an average value of the x-axis component, an average value of the y-axis component and an average value of the z-axis component acquired by the acquisition unit,
calculating a first indicator value based on the coordinate transformation matrix, the x-axis component, the y-axis component and the z-axis component,
finding a first feature amount based on an amplitude of the acceleration signal, the first indicator value being a value that indicates a change in acceleration in a horizontal direction,
performing band pass filter processing of N amplitudes of the acceleration signal to find a second feature amount, N being an integer greater than 1,
finding a second indicator value from the first feature amount and the second feature amount, wherein
a value based on an amplitude without performing filter processing is used as the first feature amount, and a value based on an amplitude after passing through a band pass filter with a pass band of a low-frequency of 1 to 3 Hz is used as the second feature amount, and
the ratio of the first feature amount to the second feature amount is used as the second indicator value, and
discriminating between a first state where a person is in a first type of vehicle and a second state where the person is in a second type of vehicle that is different from the first type, based on the first indicator value and the second indicator value.

18. A state detecting method comprising:
acquiring an x-axis component, a y-axis component and a z-axis component of an acceleration signal from an acceleration sensor included in a telephone;
calculating a coordinate transformation matrix for removing acceleration components due to gravitational acceleration, the coordinate transformation matrix being calculated from an average value of the x-axis component, an average value of the y-axis component and an average value of the z-axis component that are acquired;
calculating a first indicator value based on the coordinate transformation matrix, the x-axis component, the y-axis component and the z-axis component, the first indicator value being a value that indicates a change in acceleration in the horizontal direction,
finding a first feature amount based on an amplitude of the acceleration signal;
performing band pass filter processing of N amplitudes of the acceleration signal to find a second feature amount, N being an integer greater than 1,
finding a second indicator value from the first feature amount and the second feature amount, wherein
a value based on an amplitude without performing filter processing is used as the first feature amount, and a value based on an amplitude after passing through a band pass filter with a pass band of a frequency of 1 to 3 Hz is used as the second feature amount, and
the ratio of the first feature amount to the second feature amount is used as the second indicator value; and
discriminating between a first state where a person is in a first type of vehicle and a second state where the person is in a second type of vehicle that is different from the first type, based on the first indicator value and the second indicator value.

* * * * *